United States Patent
Curry et al.

(10) Patent No.: US 7,356,183 B2
(45) Date of Patent: *Apr. 8, 2008

(54) SEGMENTATION METHOD AND SYSTEM FOR MULTIPLE RASTER CONTENT (MRC) REPRESENTATION OF DOCUMENTS

(75) Inventors: Donald J. Curry, Menlo Park, CA (US); Doron Kletter, San Mateo, CA (US); Asghar Nafarieh, Menlo Park, CA (US)

(73) Assignee: Xerox Corporation, Norwalk, CT (US)

( * ) Notice: Subject to any disclaimer, the term of this patent is extended or adjusted under 35 U.S.C. 154(b) by 943 days.

This patent is subject to a terminal disclaimer.

(21) Appl. No.: 10/612,248

(22) Filed: Jul. 1, 2003

(65) Prior Publication Data

US 2004/0042687 A1 Mar. 4, 2004

Related U.S. Application Data

(60) Provisional application No. 60/393,244, filed on Jul. 1, 2002.

(51) Int. Cl.
*G06K 9/34* (2006.01)
*G06K 9/36* (2006.01)

(52) U.S. Cl. ............... 382/173; 382/283; 382/292

(58) Field of Classification Search ........... 382/173, 382/176, 180, 282–284, 291, 292
See application file for complete search history.

(56) References Cited

U.S. PATENT DOCUMENTS

| | | | |
|---|---|---|---|
| 4,849,914 A | 7/1989 | Medioni et al. | |
| 5,515,452 A | 5/1996 | Penkethman et al. | |
| 5,583,659 A | 12/1996 | Lee et al. | |
| 5,745,596 A | 4/1998 | Jefferson | |
| 5,900,953 A | 5/1999 | Bottou et al. | |
| 6,058,214 A | 5/2000 | Bottou et al. | |
| 6,301,386 B1 * | 10/2001 | Zhu et al. | 382/176 |
| 6,324,305 B1 | 11/2001 | Holladay et al. | |
| 6,343,154 B1 | 1/2002 | Bottou et al. | |
| 6,400,844 B1 | 6/2002 | Fan et al. | |
| 6,633,670 B1 | 10/2003 | Matthews | |

(Continued)

FOREIGN PATENT DOCUMENTS

EP 0 712 094 A2 5/1996

(Continued)

OTHER PUBLICATIONS

U.S. Appl. No. 10/187,499, filed Jul. 2002, Donald J. Curry et al.

(Continued)

*Primary Examiner*—Colin LaRose
(74) *Attorney, Agent, or Firm*—Oliff & Berridge, PLC

(57) ABSTRACT

A method and a system for separating an image signal into a set of image planes in accordance with a control signal. The system comprises a selector module, an edge processing module and a foreground/background separation module. The selector module receives the control signal and produces a selector signal. The edge processing module receives the selector signal and produces a decision signal. The foreground/background separation module receives the image signal and the decision signal, and outputs a foreground signal and a background signal, a representation of the current pixel of the image signal being included in at least one of the foreground signal and the background.

12 Claims, 10 Drawing Sheets

U.S. PATENT DOCUMENTS 6,731,800 B1 * 5/2004 Barthel et al. .............. 382/176
6,987,882 B2 * 1/2006 Curry et al. ................ 382/173
7,120,297 B2 * 10/2006 Simard et al. ............. 382/166

FOREIGN PATENT DOCUMENTS

EP      1 006 716 A2      6/2000

OTHER PUBLICATIONS

U.S. Appl. No. 10/188,026, filed Jul. 2002, Donald J. Curry et al.
U.S. Appl. No. 10/188,157, filed Jul. 2002, Donald J. Curry et al.
U.S. Appl. No. 10/188,249, filed Jul. 2002, Donald J. Curry et al.
U.S. Appl. No. 10/188,277, filed Jul. 2002, Donald J. Curry et al.
U.S. Appl. No. 10/612,057, filed Jul. 2003, Donald J. Curry et al.
U.S. Appl. No. 10/612,062, filed Jul. 2003, Donald J. Curry et al.
U.S. Appl. No. 10/612,063, filed Jul. 2003, Donald J. Curry et al.
U.S. Appl. No. 10/612,064, filed Jul. 2003, Donald J. Curry et al.
U.S. Appl. No. 10/612,084, filed Jul. 2003, Donald J. Curry et al.
U.S. Appl. No. 10/612,234, filed Jul. 2003, Donald J. Curry et al.
U.S. Appl. No. 10/612,246, filed Jul. 2003, Donald J. Curry et al.
U.S. Appl. No. 10/612,250, filed Jul. 2003, Donald J. Curry et al.
U.S. Appl. No. 10/612,368, filed Jul. 2003, Donald J. Curry et al.
U.S. Appl. No. 10/612,461, filed Jul. 2003, Donald J. Curry et al.
U.S. Appl. No. 10/612,261, filed Jul. 2003, Donald J. Curry et al.
R. De Queiroz, "Compression of Compound Documents," *IEEE*, 1999.
U.S. Appl. No. 10/776,515, filed Feb. 12, 2004, Curry et al.
U.S. Appl. No. 10/776,514, filed Feb. 12, 2004, Curry et al.
U.S. Appl. No. 10/776,608, filed Feb. 12, 2004, Curry et al.
U.S. Appl. No. 10/776,602, filed Feb. 12, 2004, Curry et al.
U.S. Appl. No. 10/776,620, filed Feb. 12, 2004, Curry et al.
U.S. Appl. No. 10/776,603, filed Feb. 12, 2004, Curry et al.
U.S. Appl. No. 10/776,509, filed Feb. 12, 2004, Claassen et al.
U.S. Appl. No. 10/776,508, filed Feb. 12, 2004, Curry et al.
U.S. Appl. No. 10/776,516, filed Feb. 12, 2004, Curry et al.
U.S. Appl. No. 10/776,612, filed Feb. 12, 2004, Curry et al.

* cited by examiner

FIG. 7
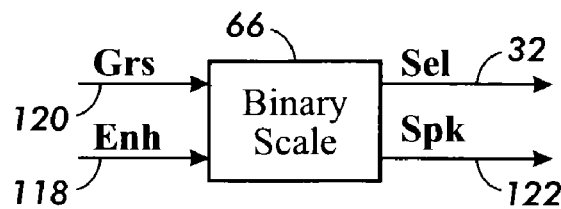
FIG. 8
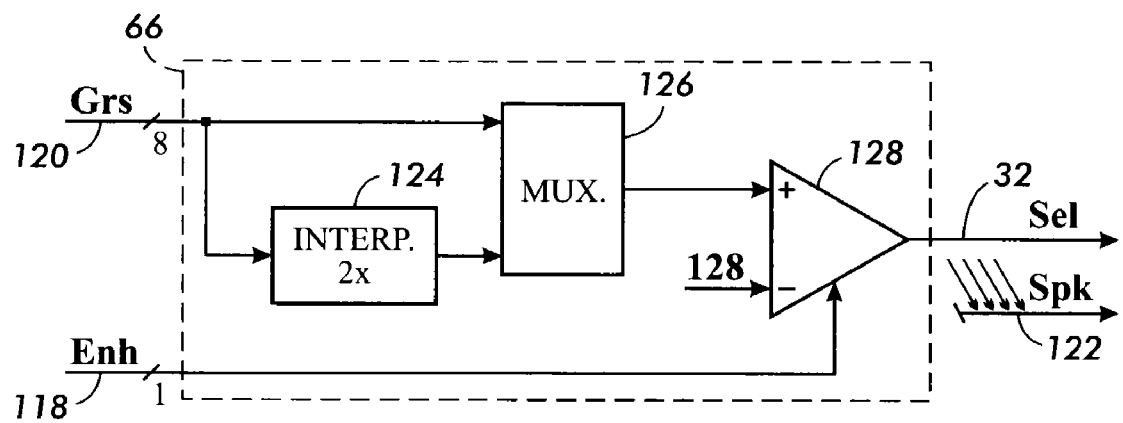
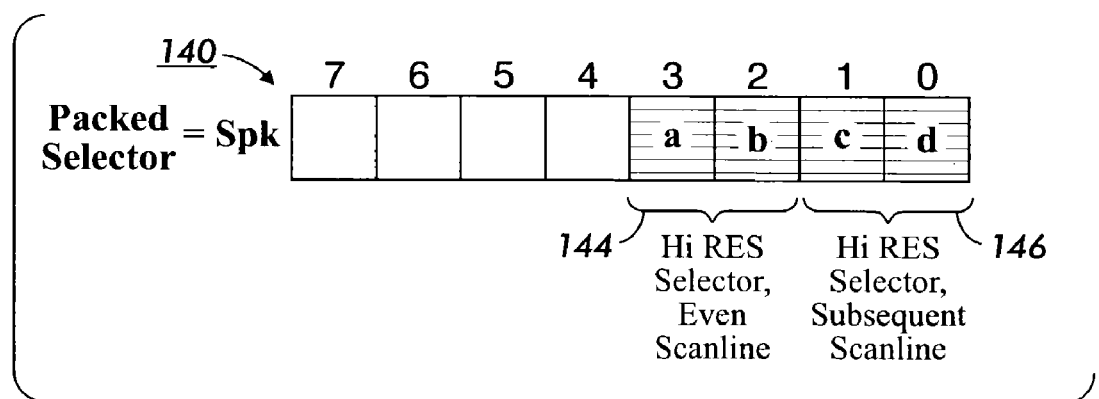
FIG. 9

| Priority | Class | Description | Associate with |
|---|---|---|---|
| 1 | IsImage | center pixel tagged as image | =>Bgr |
| 2 | CtrWhite | center pixel is white | =>Bgr |
| 3 | OutWhite | one of the outer pixels is white | =>Fgr |
| 4 | CtrBlack | center pixel is black | =>Fgr |
| 5 | OutBlack | one of the outer pixels is black | =>Fgr |
| 6 | OthDark | only two classes and other is dark | =>Bgr |
| 7 | OthLite | only two classes and other is lite | =>Fgr |
| 8 | CtrText | center pixel tagged as text | =>Fgr |
| 9 | OutText | one of outer pixels tagged as text | =>Bgr |
| 10 | Other | None of the above | =>Fgr (weak) |

SEGMENTATION METHOD AND SYSTEM FOR MULTIPLE RASTER CONTENT (MRC) REPRESENTATION OF DOCUMENTS

This application is based on a Provisional Patent Application No. 60/393,244 filed Jul. 1, 2002.

CROSS-REFERENCE TO RELATED APPLICATIONS

The present application is related to the following co-pending applications: Ser. No. 10/187,499 entitled "Digital De-Screening of Documents", Ser. No. 10/188,026 entitled "Control System for Digital De-Screening of Documents", Ser. No. 10/188,277 entitled "Dynamic Threshold System for Multiple Raster Content (MRC) Representation of Documents", Ser. No. 10/188,157 entitled "Separation System for Multiple Raster Content (MRC) Representation of Documents", and Ser. No. 60/393,244 entitled "Segmentation Technique for Multiple Raster Content (MRC) TIFF and PDF all filed on Jul. 1, 2002 and all commonly assigned to the present assignee, the contents of which are herein incorporated by reference.

BACKGROUND OF THE INVENTION

1. Field of the Invention

The present invention relates generally to methods and systems for segmenting digitally scanned documents into two or more planes, and more particularly to methods and systems for segmenting digitally scanned documents into planes suitable for a Multiple Raster Content (MRC) representation of documents.

2. Description of Related Art

The MRC representation of documents is versatile. It provides the ability to represent color images and either color or monochrome text. The MRC representation enables the use of multiple "planes" for the purpose of representing the content of documents. The MRC representation is becoming increasingly important in the marketplace. It has been already established as the main color-fax standard.

In an MRC representation, an image is represented by more than one image plane. The main advantage of the MRC representation of documents is to provide an efficient way to store, transmit, and manipulate large digital color documents. The method exploits the properties of the human vision system, where the ability to distinguish small color variations is greatly reduced in the presence of high-contrast edges. The edge information is normally separated from the smoothly varying color information, and encoded (possibly at higher resolution than 1 bit per pixel) in one of the planes, called the Selector plane. Following a careful separation, the various planes could be independently compressed using standard compression schemes (such as JPEG and G4) with good compression and high quality at the same time.

There is a need for a method and a system for efficiently separating an image into a set of planes, such that the advantages of the MRC representation can be fully exploited.

SUMMARY OF THE INVENTION

A method and a system for separating an image signal into a set of image planes in accordance with a control signal. The system comprises a selector module, an edge processing module and a foreground/background separation module. The selector module receives the control signal and produces a selector signal. The edge processing module receives the selector signal and produces a decision signal. The foreground/background separation module receives the image signal and the decision signal, and outputs a foreground signal and a background signal, a representation of the current pixel of the image signal being included in at least one of the foreground signal and the background

BRIEF DESCRIPTION OF THE DRAWINGS

The features and advantages of the present invention will become apparent from the following detailed description of the present invention in which:

FIG. 7 is a block diagram of the Binary Scale Module.
FIG. 8 illustrates the operation of the Binary Scale Module.
FIG. 9 illustrates a packed selector format.
FIG. 14 is a table showing PDL Segmentation Module Classes.

DETAILED DESCRIPTION OF THE INVENTION

The present invention provides a method and a system for separating an image signal into a set of image planes. The image signal represents a digitally scanned document. The image planes are suitable for a Mixed Raster Content (MRC) representation of the digitally scanned document.

Figure 1:
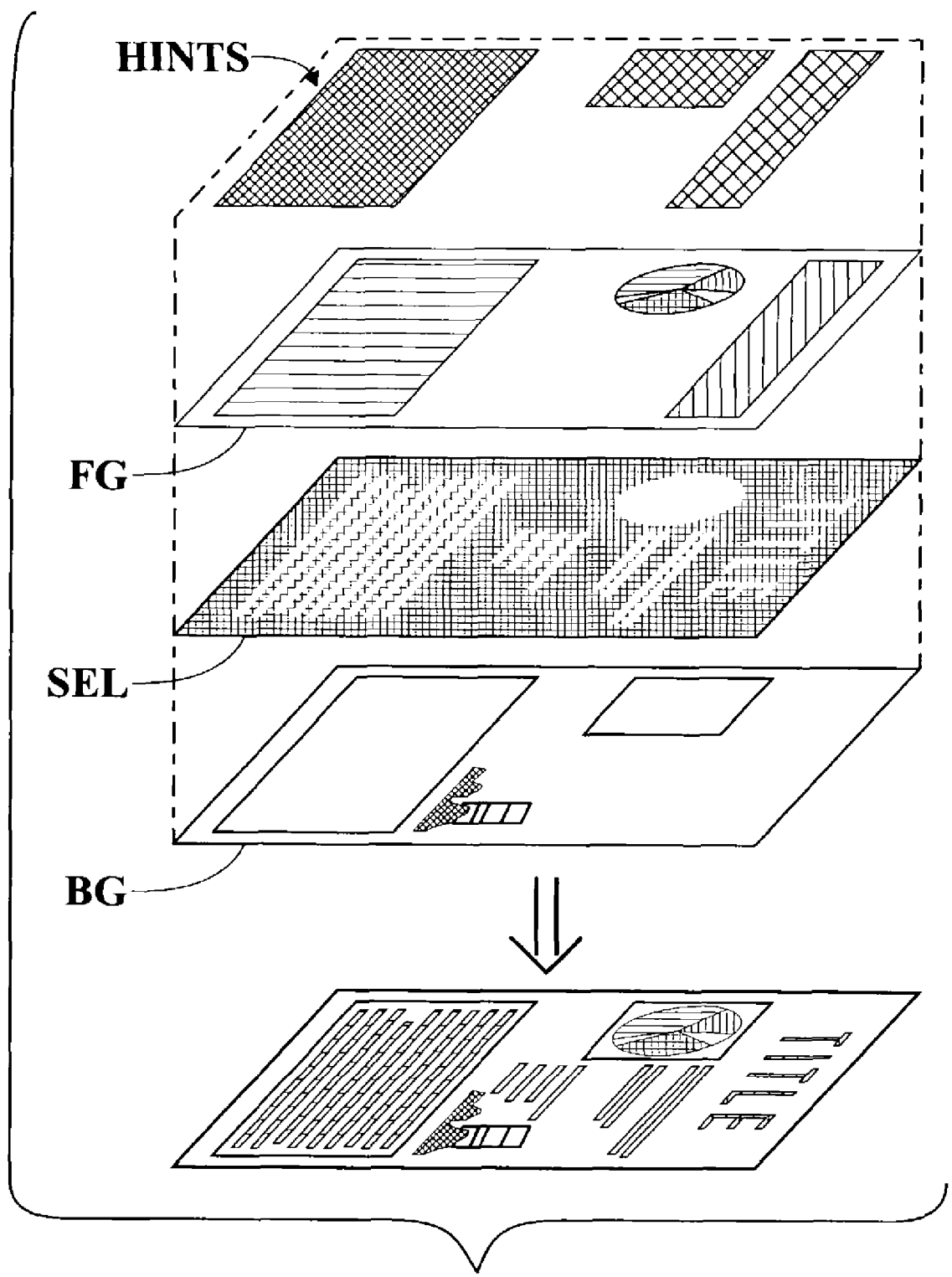
FIG. 1 illustrates the MRC structure for documents.

FIG. 1 shows the general MRC representation. The representation comprises up to four independent planes: Foreground, Background, Selector, and Rendering Hints. In the most general case, there could be multiple Foreground and Selector pairs at higher levels. However, in most applications, the representation is limited to three or four planes. The Background plane is typically used for storing continuous-tone information such as pictures and/or smoothly varying background colors. The Selector plane normally holds the image of text (binary) as well as other edge information (e.g., line art drawings). The Foreground plane usually holds the color of the corresponding text and/or line art. However, the MRC representation only specifies the planes and their associated compression methods. It does not otherwise restrict nor enforce the content of each of the planes. The content of each of the planes may be defined appropriately by an implementation of the MRC representation.

The MRC structure also allows for a fourth plane, the Rendering Hints plane, which is used for communicating additional information about the content of the document. For example, the Rendering Hints plane may carry the ICC (International Color Consortium) color hints that identify the best color matching strategy for the various objects on the page.

The Foreground and Background planes are defined to be two full-color (L, a, b) or YCC planes. The Selector plane is defined as a binary (1-bit deep) plane. The Rendering Hints plane is typically restricted to an 8-bit plane. One exemplary MRC representation specifies that the Foreground and Background are to be JPEG compressed, and that the Selector plane is to be ITU-G4 compressed (standard Group 4 facsimile compression). The Rendering Hints plane is considered to be optional, but if one is used, a compression scheme similar to the Lempel-Zev-Welch scheme may be used for its compression. In general, the Foreground, Background, Selector and Rendering Hints planes can all be at different resolutions, and they are not required to maintain the original source input resolution.

The method for assembling back a "segmented" MRC image from its components (i.e., planes) is by "pouring" the Foreground colors through the Selector plane "mask" on top of the Background plane, thus overwriting the previous content of the Background plane at these locations. In other words, the assembly is achieved by multiplexing between the Foreground and Background information on a pixel by pixel basis, based on the binary control signal of the Selector plane. For example, if the Selector value is 1, the content of Foreground is used; otherwise (i.e., for Selector value=0) the content of Background is used. The multiplexing operation is repeated on a pixel by pixel basis until all of the output pixels have been defined.

The main advantage of the MRC representation of documents is to provide an efficient way to store, transmit, and manipulate large digital color documents. The method exploits the properties of the human vision system, where the ability to distinguish small color variations is greatly reduced in the presence of high-contrast edges. The edge information is normally separated from the smoothly varying color information, and encoded (possibly at higher resolution than 1 Selector sample per source pixel) in the Selector plane. Following a careful separation, the various planes could be independently compressed using standard compression schemes (such as JPEG and G4) with good compression and high quality at the same time.

Figure 2:
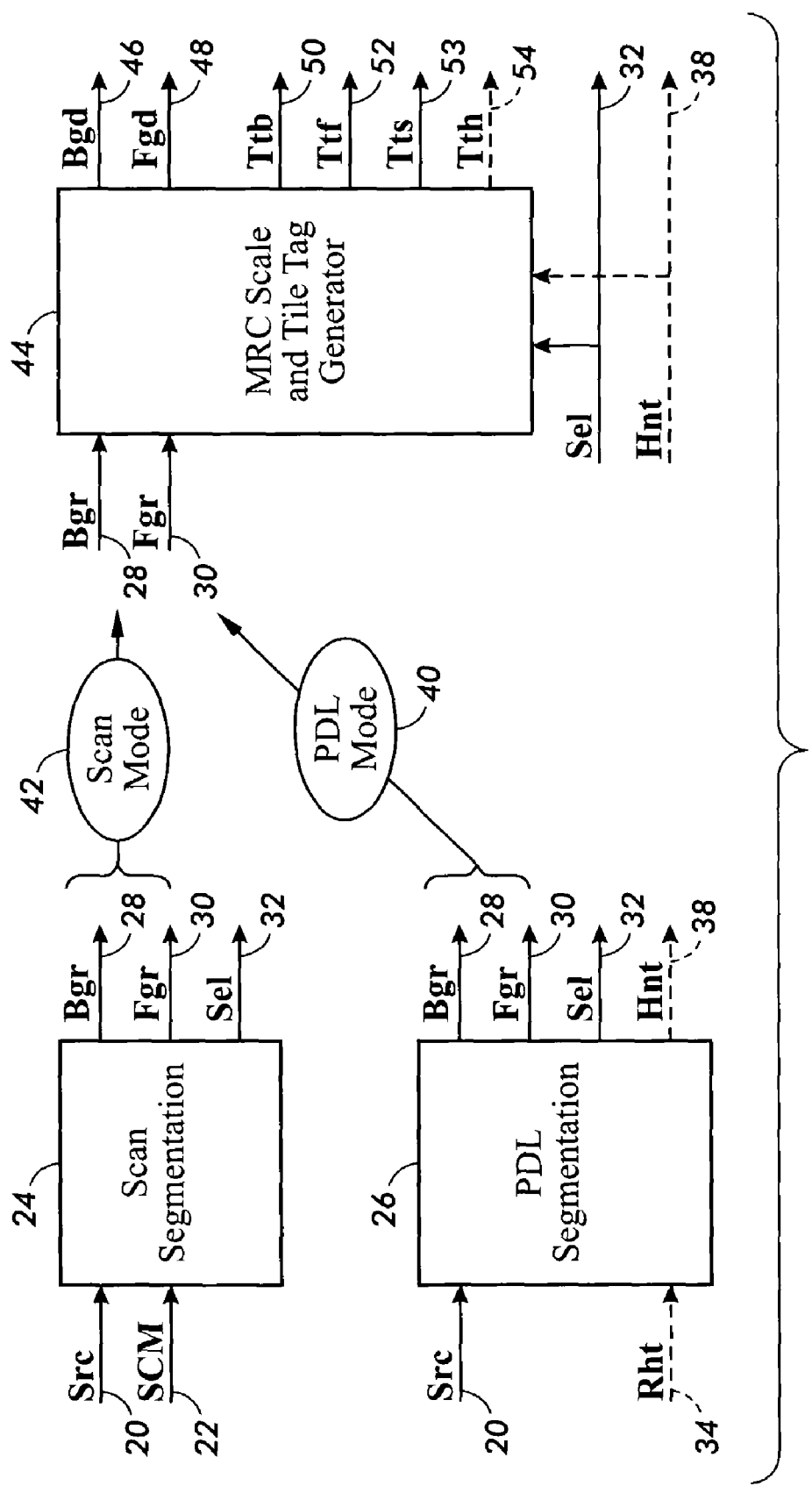
FIG. 2 is a block diagram of the Segment Module.

The Segment Module takes in a full color input image to be segmented and produces three separate outputs for the three MRC planes: the Foreground FGD, Background BGD, and Selector Sel planes, as well as several additional signals. A block diagram of the Segment Module is shown in FIG. 2. The Segment Module is composed of two stages: a Segmentation stage 24, followed by an MRC Scale and Tile Tag Generation stage 44. The Segmentation stage 24 can operate in one of two mutually exclusive modes: Scan Segmentation 24 or PDL Segmentation 26.

The primary input to the Scan Segmentation Module 24 is Src 20. It also utilizes an 8-bit screen magnitude estimate signal SCM 22, which is further detailed in Applicant's pending application D/A3011. The Scan Segmentation Module 24 outputs the full-color (raw) Foreground and Background planes Fgr 30 and Bgr 28, and (possibly super sampled) Sel 32, which is exported by the module 24.

In PDL mode 40, the PDL Segmentation Module 26 does not use SCM 22, but instead may use the signal Rht 34, which captures hint information from the PDL interpreter and will be encoded into a CEF Hint plane Hnt 38. The output from the PDL Segmentation Module 26 includes the full-color (raw) Foreground and Background planes Fgr 30 and Bgr 28, the binary Selector plane Sel 32, and possibly the Hint plane Hnt 38 when hints are present. As indicated above, the Hint plane can be 1-bit or 8-bit deep.

The Src 20 image for Scan mode 42 and PDL mode 40 typically have been processed differently. The Scan Segment Module 24 relies on the input being de-screened. This is not required for the clean, noise free images directly generated from PDL sources.

For Scan processing, the chroma components of the source input image Src 20, are assumed to be sub-sampled by a factor of 2 in the fast scan (x) direction (XCSS). None of the color images produced by the segmentor will use XCSS. When the chroma samples of the source image are accessed, no 'adjustment' filtering is required. That is for the 4 sample XCSS quad: $L_0A_0L_1B_1$; pixel 0 is $L_0A_0B_1$ and pixel 1 is $L_1A_0B_1$.

The Selector plane Sel output is binary (1 bit deep), and the packed Selector plane Spk packs together 2×2 binary neighboring Selector pixels (4 bits).

For PDL processing, the source input Src 20 is assumed to be a full-color image where the chroma channels are typically not sub-sampled, and therefore are at the same resolution as the luminance channel.

In general, the exported Foreground, Background, and Selector planes could all be at different resolutions relative to the input image. For example, the Foreground and Background planes are typically down-sampled while the Selector plane may be up-sampled from the original input resolution. The amount of up or down sampling is programmable under software control.

The MRC Scale and Tile Tag Generation Module (FG/BG Cleanup Module) 44 reads in the initial (raw or rough) Background Bgr 28, and in Foreground Fgr 30, Selector Sel 32, and the optional Hints Hnt 38 if any exist (PDL mode only). It produces the final color MRC layers: Background Bgd 46 and Foreground Fgd 48, by subsampling and filling in the 'holes' or previously unassigned pixels in the raw images. In addition, the MRC Scale and Tile Tag Generation Module 44 generates four associated Tile Tag signals for the Background Ttb 50, Foreground Ttf 52, Selector Tts 53, and optional Rendering Hints Tth 54 if any exist (PDL mode only). The Tile Tag is one binary bit per tile (or strip) indicating whether the current tile may be altogether omitted. This further reduces the overall file size. Missing tiles are automatically filled to pre-defined default color for each plane.

The Scan Segmentation Module 24 is responsible for performing the MRC segmentation into three planes in the case of scanned documents. The inputs to the Scan Segmentation Module include the input color signal Src 20 and the 8-bit screen magnitude estimate signal SCM 22. The Scan Segmentation Module 24 outputs the full-color (raw) Foreground and Background planes Fgr 28 and Bgr 30, and the Selector Sel 32 plane.

Figure 3:
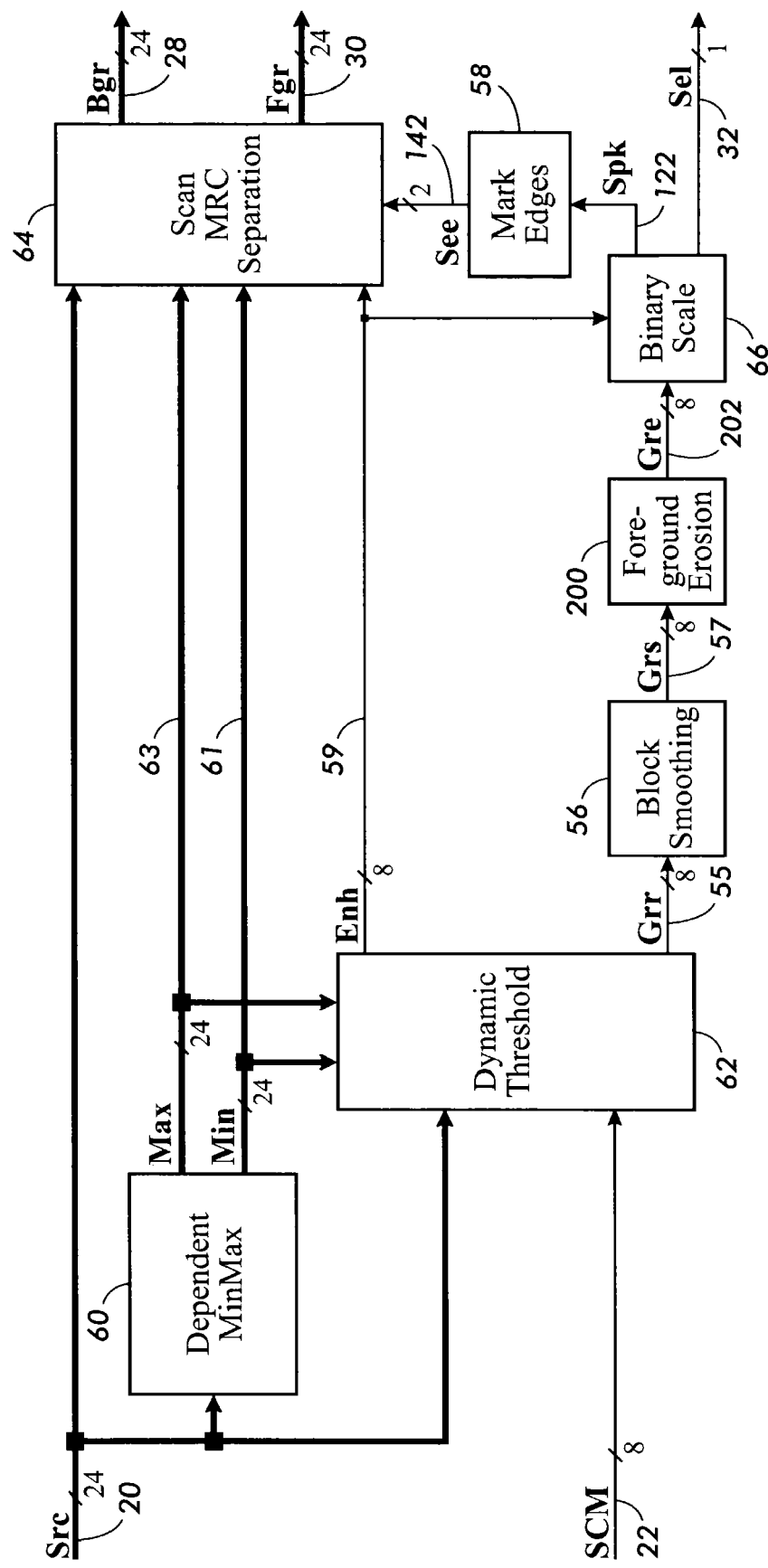
FIG. 3 is a block diagram of the Scan Segment Module.

The block diagram of the Scan Segmentation Module 24 is shown in FIG. 3. The following is a brief description of the various modules comprising the Scan Segmentation Module 24. The color input signal Src 20 is forwarded to the Dependent Min-Max Module 60, which searches in a 7×7 window centered on the current pixel of interest for the minimum Min and maximum Max color values for dynamic thresholding.

The minimum Min 61 and maximum Max 63 values are forwarded to the Dynamic Threshold Module 62 and the Scan MRC Separation Module 64. The Dynamic Threshold Module 62 also uses the input color image Src 20 and the 8-bit Screen Magnitude estimate signal SCM 22. A Dynamic Threshold Module 62 outputs the monochrome 8-bit signal Grr 55, the biased zero crossings of which represent the locations of edges in the Selector planes. In addition, The Dynamic Threshold Module 62 also generates an 8-bit segmentation enhancement control Enh 59, which is used to communicate to the Scan MRC Separation Module 64, on a pixel-by-pixel basis, if segmentation is to be applied, and if so, how much additional enhancement to apply.

The purpose of the Block Smoothing Unit 56 is to move weak (a.k.a. false) edges away from strong edges to prevent high contrast transitions within the Foreground and Background JPEG minimum coded unit (MCU) blocks. If there are no strong edges nearby, the weak edges are pushed out of the JPEG block to the boundary between neighboring blocks. This process eliminates unnecessary sharp transitions within JPEG blocks, thereby increasing the overall compression and quality. The output from the Block Smoothing Unit 56 is an 8-bit smoothed Grs 57 signal, which represents a smoothed (filtered) version of the incoming signal Grr 55.

The Foreground Erosion Unit 200 is used to meet thin (but unbroken) text requirements using linear YCC segmentation. A fixed value is subtracted from the gray selector, thereby thinning/eroding the foreground. This is only done if a neighborhood test verifies that the thinning won't result in broken lines, as will be more fully described below. The output is a smoothed Gre 202 signal or the Grs 57 signal.

The Binary Scale Unit 66 provides the capability to super-sample the resulting smoothed gray selector signal Grs 57 from the Block Smoothing 56 output. In the normal 1:1 mode, the Grs 57 signal is threshold to produce the binary Selector plane output Sel 32. However, for high-quality text and line-art reproduction, the Selector plane may be super-sampled at twice the input resolution (e.g., at 1200 dpi for a 600 dpi input). The super-sampling of the Selector signal is done by doubling the sampling frequency prior to thresholding. The resulting binary Selector pixels at the higher resolution are packed, four neighbors at a time, into the packed Selector signal Spk 122.

The Mark Edge Processing Module 58 takes in the packed high resolution Selector output Spk 122 and counts the number of on and off pixels in a 5×5 [high-resolution] window centered on the current [low-resolution] pixel of interest. The output from the Mark Edge Processing Module 58 is the two-bit signal See 142. The See signal 142 is set to 0 if all of the input pixels inside the 5×5 window are off (corresponding to a 3×3 constant background area). Similarly, the See signal 142 is set to 3 if all of the input pixels inside the window are on (corresponding to a 3×3 constant foreground area). In addition, the See output is set to 1 or 2 if the 5×5 window is mostly background or mostly foreground, respectively.

Finally, the Scan MRC Separation Module 64 takes in the full color source signal Src 20 to be segmented as well as the color minimum and maximum (Min, Max) from the Dependent Min-Max Module 60. In addition, the MRC Separation Module 24 uses the See signal 142 from the Mark Edge Processing Module 58, and the segmentation and enhancement signal Enh 59 from the Dynamic Threshold Module 62. The MRC Separation Module 64 actually produces the two full-color outputs Fgr 24 and Bgr 30 as the rough estimates of the Foreground and Background planes, respectively. The various modules of the Scan Segmentation Module will now be further described below.

Figure 4:
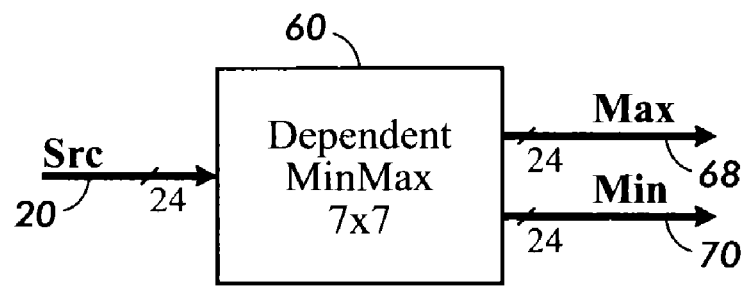
FIG. 4 is a block diagram of the Dependent Min-Max Module.

A block diagram of the Dependent Min-Max Module is shown in FIG. 4. The Dependent Min-Max Module 60 inputs the Src signal 20 and examines a 7×7 window centered on the pixel of interest 80 to find the max L and min L pixels, L being the luminance channel. The Max output 68 is the pixel that has the max L 72. The Min output 70 is the pixel that has the min L 74. The resulting chroma values are therefore dependent on the locations of where the extreme luminance values were found.

Figure 5:
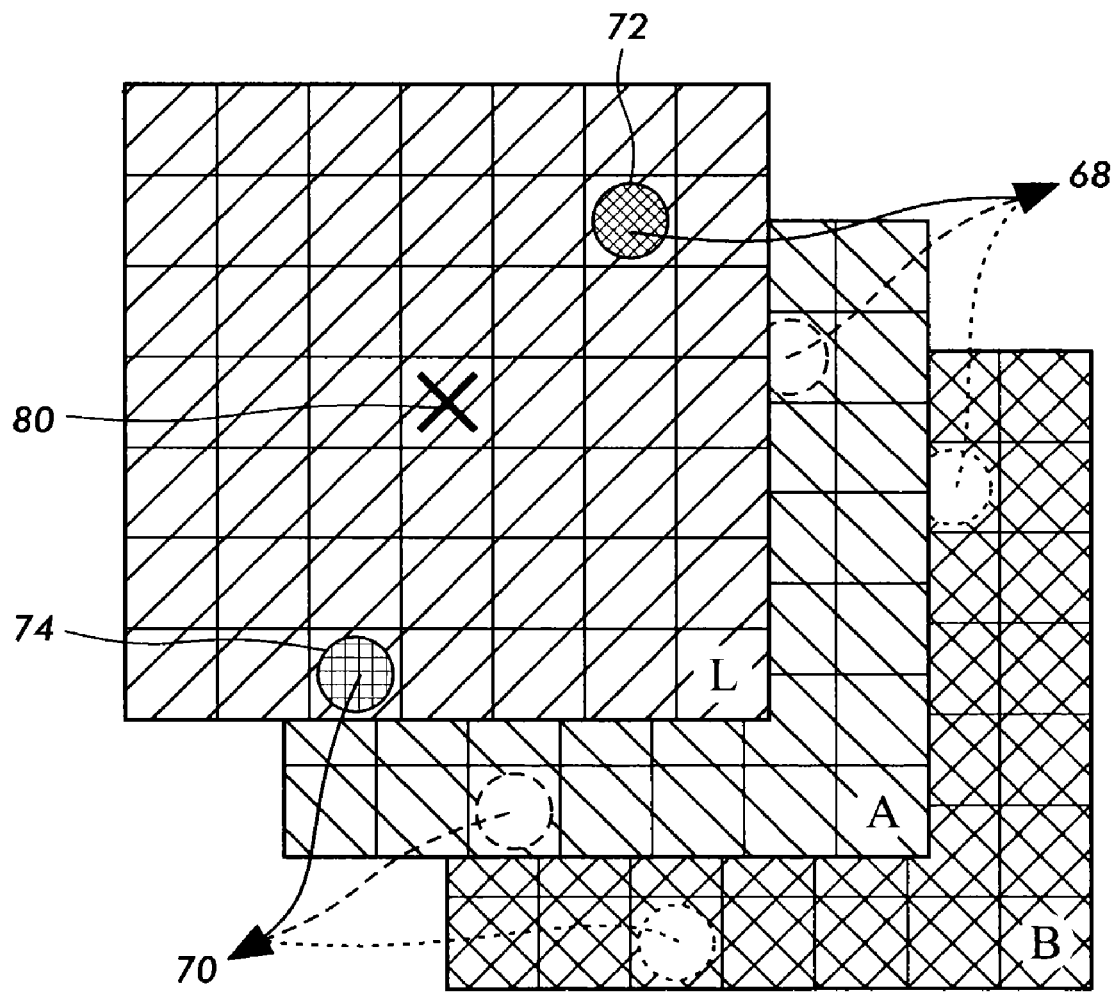
FIG. 5 illustrates the operation of the Dependent Min-Max Module.

The operation of the Dependent Min-Max Module 60 is illustrated in FIG. 5. The operation proceeds in two steps. In the first step, the Dependent Min-Max Module 60 searches across the window for the largest 68 and smallest 70 samples of the luminance component L. Once the locations of the minimum 74 and maximum luminance 72 values are found, they are output along with the chroma components (A,B) at these locations. Even though the Src signal 20 arrives at this module with X subsampled chroma components, this is the point at which the X chroma subsampling ceases. That is, the Max and Min color signals do not have X sub-sampled chrominance.

This filtering operation is separable. For instance the Min/Max of individual columns can be computed first, and then the final Min 74 can be computed by finding the column Min pixel that has the minimum L. This means that the incremental work required as the window in stepped across the Src image amounts to computing one 7 high column and one 7 wide row for both the Min and the Max outputs.

Figure 6:
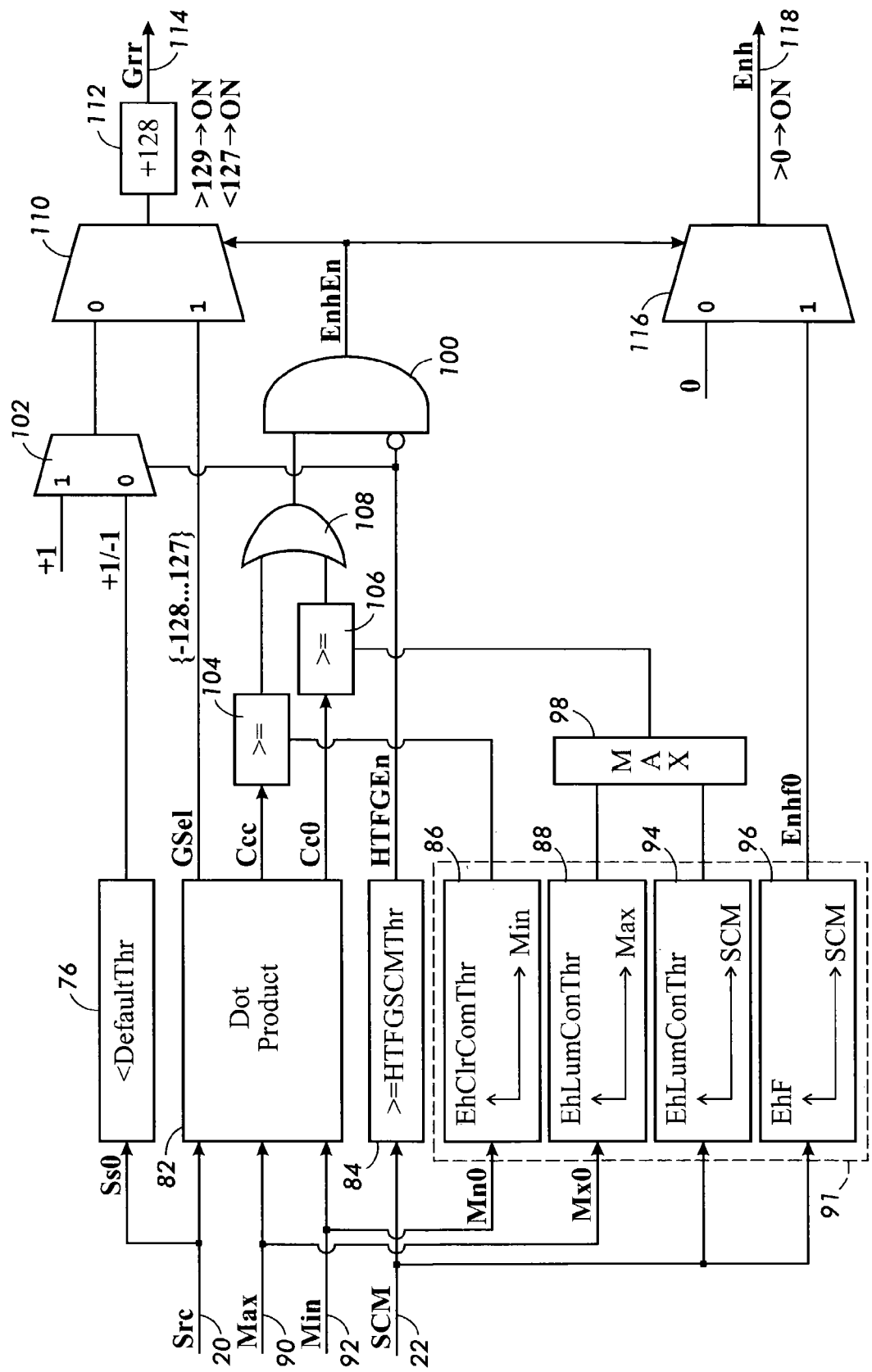
FIG. 6 is a block diagram of the Dynamic Threshold Module.

Referring to FIG. 6, the Dynamic Threshold Module 62 applies adaptive thresholding to the incoming color source signal Src 20 to generate a raw signed 8-bit gray selector signal Grr output 114, whose zero crossings represent the transitions of the Selector plane. Gray selector values >=0 mark pixels which will have selector values of 1 and be placed in the foreground. Gray selector values<0 mark pixels which will be placed in the background. As shown in FIG. 6, the Dynamic Threshold Module 60 utilizes the pair of dependent min/max values (Min, Max) 90 and 92 respectively from the Dependent Min-Max Module 60, as well as the 8-bit screen magnitude estimate signal Scm 22 from the Screen Estimation Module (SEM). The Dynamic Threshold Module 62 also produces the 8-bit signal Enh 118. The Enh signal 118 is communicated to the Scan MRC Separation Module 64 to determine how much enhancement to apply as pixels are placed in the background and/or foreground planes.

The Dynamic Threshold Module 62 operates in three segmentation modes: dynamic threshold; static threshold and force-to-foreground. Static thresholding is applied when the image is smooth (unchanging). In this mode, pixels with luminance values greater-than-or-equal-to DefaultThr 76 are assigned to the background (Grr=127=−1) and pixels with luminance values less than DefaultThr are assigned to the foreground (Gr==129=+1). Note 127 and 129 (+−1) represent small magnitude values for Grr 114. These represent Weak decisions, which may be modified by the subsequent Block Smoothing module 56 by taking into account the position and polarity of nearby Strong decisions. A Strong decision is represented by a signed Grr magnitude >1 (a coded value <127 or >129). Strong decisions are only produced in the Dynamic thresholding mode and only Strong decisions may have non-zero Enh codes. Both Static thresholding and force-to-foreground modes only produce Weak decisions.

In some configurations, Force-to-foreground mode is enabled for halftone images; the mode is enabled by setting HTFGScmThr 84 to some value less than 256. Whenever Scm 22 is equal-to-or greater-than HTFGScmThr 84, Grr 114 is forced to the minimal foreground value of 129 (=+1) and Enh 118 is set to zero.

When Force-to-foreground does not override, segmentation actively switches between producing weak static threshold decisions and Strong dynamic threshold decisions. The signal EnhEn indicates a Strong decision and gates the output of the EhFVsScm function to Enh. The EhFVsScm function uses the screen magnitude estimate Scm as the domain variable. When true, EnhEn also selects the signed 8 bit signal GSel as the source for coding Grr. GSel, described in more detail below, is the primary output of the Dot Product module. As shown in FIG. 6, when Force-to-foreground (HTFGEn) does not override, the two other outputs of the Dot-Product unit Ccc and Cc0 (described below) are tested, and the results are ORed together to compute EnhEn.

If Ccc is >=the output of the EhClrConThrVsMin function then EnhEn is enabled. Else if Cc0 >=the maximum of the EhLumConThrVsMax function and the EhLumConThrVsScm function then EnhEn is enabled. The input signals for the EhClrConThrVsMin and EhLumConThrVsMax functions are the luminance components of the Min and Max signals respectively. The input signal for the EhLumConThrVsScm function is Scm.

The Dot Product Unit 82 (second block on the top left in FIG. 6) uses the full-color input signal Src 20 as well as the full-color minimum 92 and maximum 90 values (Min, Max) from the Dependent Min and Max Unit. These values represent the extreme luminance values, and corresponding chroma values, found within the (7×7) window centered on the current pixel of interest. The operation of this block is primarily performing the dot-product multiplication of two vectors:

$$GSel = \min(127, \max(-127, \langle X,Y \rangle / 256)); \quad (1)$$

Where $\langle X, Y \rangle$ is a dot-product operation between the two vectors X and Y:

$$\langle X,Y \rangle = (X_L, X_A, X_B)(Y_L, Y_A, Y_B)^t = X_L Y_L + X_A Y_A + X_B Y_B; \quad (2)$$

where $$X = Max - Min = \begin{bmatrix} L_{MAX} - L_{MIN} \\ A_{MAX} - A_{MIN} \\ B_{MAX} - B_{MIN} \end{bmatrix}; \quad (3)$$

and $$Y = Src - (Max + Min)/2 = \begin{bmatrix} L - (L_{MAX} + L_{MIN})/2 \\ A - (A_{MAX} + A_{MIN})/2 \\ B - (B_{MAX} + B_{MIN})/2 \end{bmatrix}; \quad (4)$$

As an embodiment for further improvement, when LMN==0 the value of the luminance component in equation (4) changes from $L_{MX}/2$ to $L_{MX}/4$. This is a first order attempt to adjust for a luminance-undershoot typically produced by previous sharpening stage. This helps prevent thin text features from becoming enlarged by the segmentation process.

$$Y(L_{MN} = 0) = \begin{bmatrix} L - (L_{MAX})/4 \\ A - (A_{MAX} + A_{MIN})/2 \\ B - (B_{MAX} + B_{MIN})/2 \end{bmatrix} \quad (5)$$

The (L, A, B) values in equation (4) or (5) are the corresponding color components of the incoming signal Src 20. The X vector in equation (3) is the vector difference between the maximum and minimum values of (Min, Max). The Y vector in equation (4) is the incoming signal Src 20 minus the min and max average. By taking the dot product of these two vectors, the output is proportional to the relative distance from the plane, which is perpendicular to the X vector and crosses it halfway along. Note that $\{X_A, X_B, Y_L, Y_A, Y_B\}$ as well as the final output GSel may be negative. Since the absolute magnitude of the dot product output in equation (1) is not as important as identifying zero crossings, the result is simply divided by 256 (shift right by 8) to scale it back to fit the 8-bit range. (Dot product normalization would require dividing by the vector magnitudes). However, since the output may still occasionally overflow the 8-bit range (by a factor of roughly 3, or 1.5 bits at most), it is necessary to add logic to limit the output magnitude to 127 if it ever gets too large. The Dot Product 82 output is indicated as the signed 8-bit signal GSel or Gray Selector output in FIG. 6. To limit the size of the dot product multiplier to 8 bits, the components of both X and Y may be pre-scaled by ½ and the final divisor changed to 64.

The Dot Product Unit 82 also outputs two 8-bit signals that measure the luminance and chroma contrast magnitude. The luminance portion Cc0 106, is represented by the first component of the vector X:

$$Cc0 = X_L = L_{MAX} - L_{MIN} \quad (6)$$

A scalar measure for the overall chroma contrast magnitude Ccc 104 is also generated by adding together the absolute values of the two chroma-components of the vector X.

$$Ccc = |X_A| + |X_B| eq \quad (7)$$

The absolute value over the luminance component can be ignored since L is confined to the positive range [0 . . . 255], and the max is always larger than the min.

The decision logic functions 91 in the left portion of FIG. 6 govern the switching between the default and active segmentation modes. Each function is represented by a small set of (x, y) point-pairs representing a piecewise linear function. For x values less than the first x value, the output is the first y value. For x values>the last x value, the output is the last y value.

The significance of the above logic is that in order to operate under active segmentation mode, either the Dot Product luminance contrast or the Dot Product chroma contrast must be sufficiently large. The chroma contrast must be larger than a function of the minimum luminance found in the (7×7) window. Likewise, the luminance contrast must be larger than a function of the maximum luminance found within the same window, and, in addition, it must also be larger than a function of the screen magnitude Scm. Before exporting, the signed gray selector output gated by HTFGEn and EnhEn is coded as an unsigned 8 bit signal Grr 114 by adding 128.

The purpose of the Block Smoothing Unit 56 is to move weak (a.k.a. false) edges as far away from strong edges as possible. This increases the width (reduces the frequency) of pulses in the JPEG planes and thereby reduces the compressed size and compression noise. If there are no strong edges blocking it, weak edges are swept out of the block completely. If a weak edge is trapped between 2 strong edges, it is repositioned to be half way between the two. The process also merges/removes multiple weak edge transitions which improves compression in all 3 planes.

The input to the Block Smoothing Unit 56 is the 8-bit raw gray selector output Grr from the thresholding process (under either active or default segmentation). The output from the Block Smoothing Unit 56 is the 8-bit smoothed Grs signal, which represents a smoothed (filtered) version of the input signal Grr.

The very first step in the Block Smoothing Unit 56 is to subtract the bias of 128 (toggle the msb) to make Grr' a signed number. Then, the range of (Grr-128) is investigated. If it equals −1 or 1, is considered to be a weak edge, BG or FG, respectively. Anything less than −1 or above 1 is considered to be a strong BG or FG edge, respectively.

The Block Smoothing process includes four passes over a square temporary storage area (Tmp[sz][sz]) representing the size of a JPEG minimum coded unit (MCU) block for the Bgd and Fgd planes. For instance, if the Bgd and Fgd are to be subsampled by a factor of 4 for JPEG compression, and, in addition, the chrominance components are to be sub-sampled an additional factor of 2, then the MCU would be 16×16. And the Tmp block needed for this Block Smoothing algorithm would be dimensioned: Tmp[64][64]. Implementation constraints may require this block size to be smaller, in which case 32×32 would be acceptable. Note, the current pipeline configuration only requires a 32×32 block since chroma sub-sampling is not used when applying ¼ resolution reduction.

In the first pass, the (Grr-128) pixels are processed from left to right into Tmp where each row is independent. Whenever there are strong edges, the corresponding Tmp location is initialized to +/−K (a predefined constant==2*dimension of Tmp−1). The sign is same as Grr-128. Otherwise, for weak edges, Tmp is written with the previous Tmp value where its magnitude has been reduced by 1. Since the first pass is moving from left to right, the previous Tmp value is the Tmp value just to the left. The previous value of the first value in a row is defined to be 0. Reducing the magnitude by one converts +4 to +3, −2 to −1 and 0 to 0. Also, during this pass, an accumulation (WeakCnt) is computed of all the weak values: +1, −1 (only where Grr is weak).

In the second pass, each row of Tmp is traversed from right to left, this time, the magnitude reduced previous value is compared with the current value. The value with the largest magnitude is placed in the current location. Again, the previous value for the first value on the right is assumed to be 0. Since the rows of passes 1 and 2 are independent, pass 2 can be interleaved with pass 1. Passes 3 and 4 are the same as pass 2 except that their directions are top to bottom and bottom to top.

After the 4th pass the final smoothed result is produced by examining Tmp. If the Tmp value has the max magnitude (+K or −K) the value used is the original strong edge value from Grr. Otherwise the code for weak foreground or background (128+1 or 128−1) is used depending on whether the Tmp value is positive or negative.

Referring to FIG. 7, the Binary Scale Module 66 converts the 8-bit grayscale selector input Grs 120 to the binary Selector plane output Sel 32. For high-quality text and line art, the binary Selector output Sel 32 may be kept at higher resolution than the Src 20. For example, the current design allows the use of twice the resolution in each direction (SEG_Sel_ScaleUp), so that for a standard 600-dpi scanner, the output resolution of the binary Sel signal may be at 1200 dpi. The Selector Logic Module is responsible for interpolating the gray selector Grs input to the higher resolution and then threshold the signal to generate the binary output Sel 32. A redundant packed copy of Sel (Spk) 122 is also produced at the Src 20 resolution.

The block diagram of the Binary Scale Module 66 is shown in FIG. 8. The 8-bit gray selector input signal Grs 120 is first interpolated in the gray domain using 2D bilinear interpolation 124 by a factor of 2 in each direction. The output from the bilinear interpolation is passed through the multiplexer 126 to select whether to use the interpolated (super-sampled) Selector or the usual binary one at the same resolution as Src. Finally, the gray output is converted to binary producing the Selector signal Sel 32 using the threshold unit 128.

It should be noted that for the 2× interpolation-factor, the binary Sel output data rate is twice as fast as the source signal Src in each direction. This means that for every 8-bit input Grs sample, the Binary Scale Module produces four binary output Sel samples. A second packed form of the Sel output (Spk) 122 is produced in which the 4 binary selector bits are packed together as shown in FIG. 9. It is important to note that Selector output 140 is using a vector notation to indicate the higher output resolution. While the output is still considered to be binary (that is, assuming the values of either 0 or 1 only), each incoming Grs input generates four Selector bits at the output (assuming the 2× interpolation factor). The four binary pixels are packed into the 8-bit packed Selector signal Spk 122 as shown above. If the interpolation factor is only 1, then all four bits are the same.

Figure 10:
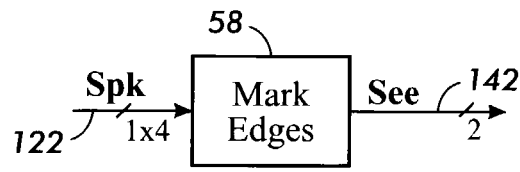
FIG. 10 is a block diagram of the Mark Edge Module.

Referring to FIG. 10, the Mark Edge Module 58 takes the packed form of the high-resolution Selector Spk 122 and counts the number of on and off pixels in a 5×5 [high-resolution] window 155 centered on the current pixel 80 of interest. The output from the Mark Edge Module 58 is the four-valued signal See 142. The See signal 142 is set to 0 if all of the input pixels inside the window are 0 (corresponding to a constant background area). Similarly, the See signal 142 is set to 3 if all of the input pixels inside the window are on (corresponding to a constant foreground area). In addition, the See output 142 is set to either 1 or 2 if the content of the window is mostly background or mostly foreground, respectively. Note that since See is only 4 values and could be coded with 2 bits.

Figure 11:
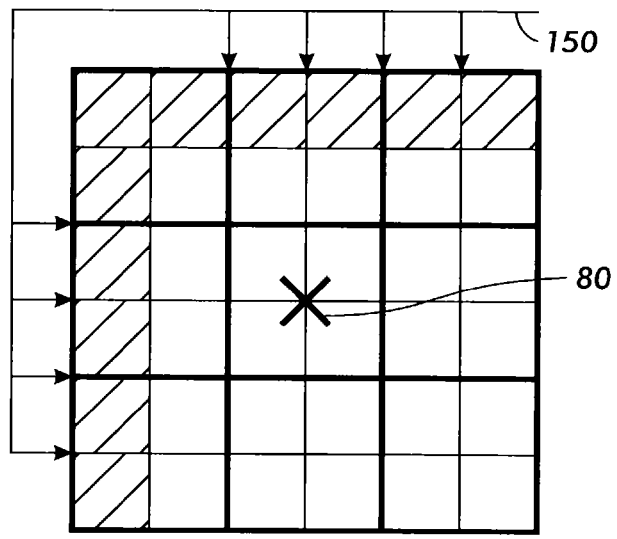
FIG. 11 illustrates the operation of the Mark Edge Module.

The operation of the Mark Edge Module 58 is illustrated in FIG. 11. The operation of the unit is as follows. The input to the Edge Processing Module 58 is the packed binary Selector signal Spk, which is at the same resolution as Src. The Edge Processing Module 58 maintains a 3×3-pixel context window (at the original input resolution) centered on the current pixel of interest. Logically, the packed selector (Spk) Selector contains four binary selector pixels for each Src resolution pixel in the 3×3-pixel window as shown in FIG. 11. The thicker lines represent the original Src resolution, which corresponds to a 6×6-pixel context window in the high-resolution domain. However, only the inner content of 5×5 high-resolution pixel area is used; the shaded area in FIG. 11 is excluded from the counting.

The 5×5 high-resolution context is designed for "detecting" potential edges in the proximity of the current pixel of interest. The window pattern uses a full context of 2 [high-resolution] pixels extending below and to the right of the current pixel, but only one from above or on the left. Note that the unique window pattern prevents any edge from overlapping with the neighboring pixels, that is—no potential edge location could be detected (i.e., shared) more than once, in association with multiple (low-resolution) pixels. The 4×4=16 possible edge locations within the current window of interest are also indicated in FIG. 11.

The Mark Edge Module 58 counts the number of high-resolution pixels that are currently turned on in the 5×5 high-resolution area. This number can range from 0 to 25. It is mapped to the output signal See from the Mark Edge Module 58 as following:

See=0 if the 5×5 count was 0 (no foreground pixels found);

See=1 if the count was in the range [1 . . . 12] (mostly background pixels);

See=2 if the count was in the range [13 . . . 24] (mostly foreground pixels);

See=3 if the count was 25 (only foreground pixels found);

Referring once again to FIG. 3, the output signal See is forwarded to the Scan MRC Separation Module 64. Note that the See signal is at the original input resolution (600 dpi typical). The Scan MRC Separation Module 64 is responsible for splitting the incoming source signal Src into the Foreground and Background planes. The Module uses the full-color minimum and maximum (Min, Max) outputs from the Dependent Min-Max Module, as well as the Marked Selector edge count signal See from the Mark Edge Module. In addition, The Scan MRC Separation Module has the capability to enhance the lifting of edges via the segmentation enhancement control signal Enh from the Dynamic Threshold Module.

The Scan MRC Separation Module 64 outputs two full-color raw initial estimates of the Foreground and Background outputs Fgr 30 and Bgr 28, respectively. The follow up module, the MRC Scale and Tile Tag Generation Module, then further processes the Fgr and Bgr to produce the final Foreground and Background outputs Fgd and Bgd, respectively.

The Scan MRC Separation Module 64 takes in the full-color source signal Src to be segmented and produces values for one of the Fgr and Bgr outputs, or sometimes for both. The Scan MRC Separation Module reserves the special code of zero luminance and chroma (L=a=b=0) to indicate an empty (undetermined) pixel in either the Foreground Fgr or the Background Bgr outputs. As the process continues across the page, some of the Foreground and Background pixels will remain undetermined. The MRC Scale and Tile Tag Generation Module will then carefully fill in the values for these undetermined pixels to keep the compression low and prevent additional JPEG ringing artifacts.

Figure 12:
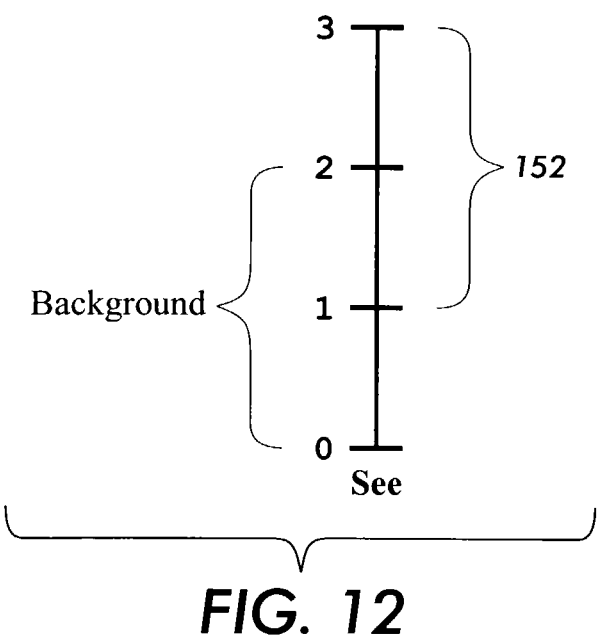
FIG. 12 illustrates the decision range for defining the Background and Foreground.

The Scan MRC Separation Module 64 uses the value of the Selector edge count signal See from the Mark Edge Module to determine whether to copy enhanced Src pixels into the Background, Foreground, or both. The decision range is illustrated in FIG. 12. Basically, the enhanced Src pixels are copied into the Foreground if See≧1, and into the Background if See≦2. Consequently, the Foreground is marked as undefined if See==0 and the Background is marked as undefined if See==3.

At first, the enhancement factor Enhf1 is just the signal Enh incremented by one so the max value is 256 rather than 255:

$$Enhf=Enh \qquad (12)$$

$$Enhf1=Enhf+1 \qquad (13)$$

Next, define the following two full-color enhanced versions of the foreground and background (the purpose of which will be detailed below):

$$enhFG=LIM[Src+(Min-Src)(Enhf1/256)]; \qquad (14)$$

$$enhBG=LIM[Src+(Max-Src)(Enhf1/256)]; \qquad (15)$$

Implementation note: When the final Bgd and Fgd outputs are either XCSS (X Chroma Subsampled) or scaled down, enhFG and enhBG may be XCSS.

In equation (14) and (15) Src is the full-color input signal and Min and Max are the dependent minimum and maximum color outputs from the Dependent Min-Max Module. The limit function LIM is restricting the result to be confined to the 8-bit range [1 . . . 255] for each of the components, thereby excluding the special code of zero that is reserved for marking undefined pixels. Note that since Src and Min and Max are all full-color (L, A, B) vectors, the operations are in 3D space.

For the case where the Foreground is defined, that is—when See={1, 2 or 3} the output Fgr value is determined to be:

$$Fgr=enhFG, \text{ When } SEE=\{1,2,3\}; \qquad (16)$$

$$Fgr=0 \text{ if } SEE=0; \qquad (17)$$

When the Foreground is not used (i.e., See=0), the Foreground value is marked as undetermined by setting its value to the special code Fgr=0 (for all of the three components), per equation (16). Note: The implementation extends Enhf to a 9-bit representation and its value is incremented by 1 (Enhf1) to allow normalization by 256 instead of 255.

A close examination of equation (14) reveals that the output Foreground Fgr value is interpolated (in 3D space) between the current input signal value Src and the minimum value Min of the Dependent Min-Max Module, depending on the amount of segmentation enhancement expressed by Enhf1. When Enhf=0, no enhancement will be done and the output will be set to the input signal Fgr=Src. This would be the common case unless there would be sufficient contrast activity in the (7×7) window. When Enhf1=256 (maximum enhancement), the output will be set to the minimum signal Fgr=Min. This would normally represent the case of a pixel in the immediate vicinity of an edge, where it would be advantageous to enhance the edge by painting the Foreground darker as much as possible—as given by the minimum value in the neighborhood (0=black). In general, however, the amount of segmentation enhancement Enhf can vary between the above two extremes, and the output Foreground values will be correspondingly weighted between the Src and Min values.

Similarly, for the case of using the Background during segmentation, that is—when See={0, 1, 2}, the output Bgr value is determined by:

$$Bgr=enhBG \text{ when } See=\{0,1,2\} \qquad (18)$$

$$Bgr=0 \text{ if } See=3 \qquad (19)$$

Like before, the output Bgr value will vary between the input Src and Max values in proportion to the amount of segmentation enhancement Enhf1, as given by equation (15). Equation (18) is similar to (16), with the exception of using the maximum Max instead of the minimum Min, and the different range of See. The use of Max for the Bgr output will make it become lighter rather than darker as was the case for the use of Foreground.

Also, as indicated by equation (19) and corresponding with (17), when the Background or Foreground are not used (i.e., See=3); (see=0) respectively or Background value is marked as undetermined by setting its value to the special code Bgr=0 (for all of the three components).

The output from the MRC Separation Module is the two partially filled full-color planes Fgr and Bgr. Away from the Selector plane edges, typically only one of the Foreground or Background outputs will contain the current pixel [enhanced] color—depending on whether it was light or dark. But near edges, however, information might be carried in both the Foreground and Background channels simultaneously.

Referring to FIG. 2 the PDL MRC Segmentation Module 26 is responsible for performing the MRC segmentation into three planes in the case of PDL documents. The inputs to the PDL MRC Segmentation Module 26 include the input color signal Src 20 and any Rendering Hints Rht 34 that may be supplied from the PDL decomposer.

The PDL MRC Segmentation Module 26 outputs the full-color Foreground and Background planes Fgr 28 and Bgr 30, the binary Selector plane Sel 32, and possibly preserve some of the PDL hints in the 8-bit Hint plane Hnt.

Figure 13:
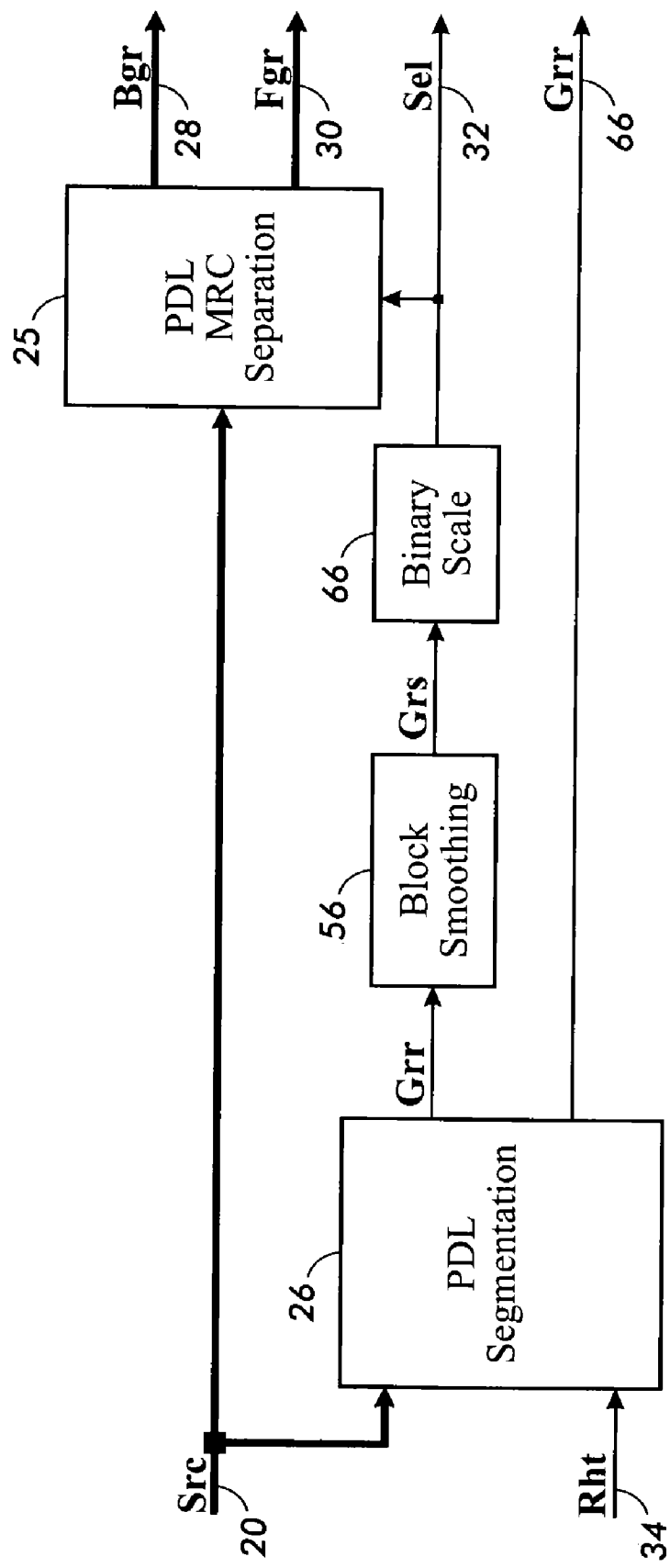
FIG. 13 is a block diagram of the PDL MRC Segmentation Module.

The block diagram of the PDL MRC Segmentation Module 25 is shown in FIG. 13. Starting from the left, the PDL Segmentor reads in the input color signal Src 20 and 8-bit rendering hints Rht 34 from the PDL interpreter. The PDL Segmentor 26 produces the 8-bit gray selector signal Grr that is similar in function to that used by the Scan processing. In addition, the PDL Segmentor outputs some of the PDL hints as MRC hints Hnt.

The gray selector signal Grr from the PDL MRC Segmentation Module 25 is processed through the Block Smoothing Unit 56 to create the smoothed gray selector signal Grs, which is forwarded to the Binary Scale Unit 66. The Binary Scale Unit 66 thresholds the Grs signal to create the binary Selector signal Sel. Since the quality of PDL data is not improved by super-sampling the selector produced by the Binary Scale unit is always at the Src resolution. The operation of the Block Smoothing Unit and Binary Scale Unit is described above, respectively.

Finally, the PDL MRC Separation Module 25 is responsible for splitting the incoming source signal Src 20 into the Foreground and Background planes Fgr 30 and Bgr 28, respectively. The separation is based on the binary Selector plane Sel 32.

The PDL Segmentation Module 26 is responsible for taking in the input color signal Src 20 and generating the 8-bit gray selector signal Grr 66. In addition, the PDL Segmentation Module 26 preserves some of the 8-bit PDL interpreter hints Rht as 8-bit MRC hints Hnt on the Hint plane.

The operation of the PDL Segmentation Module is different than the Scan processing described above. The Scan segmentation process is based on the dependent min/max analysis followed by dynamic thresholding. However, for clean PDL data, the segmentation is based on the classification of the content of the pixels in a 3×3 window centered on the current pixel of interest. The classification is prioritized as a set of rules that determines whether the current pixel is associated with the Foreground Fgr or Background Bgr planes.

For each incoming Src pixel, the content of the 3×3 window around this pixel is analyzed and classified into one or more of the following classes 158 shown in the table of FIG. 14. The 3×3 window tests are prioritized as shown in the leftmost column in FIG. 14. The smaller numbers indicate higher priority. Thus, for example, a center pixel that is tagged by the PDL interpreter to be an Image pixel, takes precedence (highest priority) over any other combination such as the center pixel being black, white, or tagged as text.

The second column in the Table of FIG. 14 lists the class name in the C code simulation. The third column provided a brief description for the meaning of the class and how it is tested. Finally, the last column shows how the class is associated (that is—segmented) into the Foreground or Background planes. The one exception to the 3×3 window testing is the case of classes 6 and 7. The processing for these classes is as following:

1. First, any outside pixel, which is not NEAR the center pixel and is also not FAR from the center pixel, is classified as Bad Pixel. The meaning of NEAR and FAR here are based on the Manhattan distance $D_M$:

If ($D_M$<PDLEqualDistLim) then NEAR;
If ($D_M$>PDLOtherlDistThr) then FAR;

Where PDLEqualDistLim and PDLOtherlDistThr are two configuration thresholds.

2. The first non-Bad outside pixel encountered, which is not NEAR the center pixel and is also FAR from the center pixel becomes the reference for the OTHER class.

3. A subsequent encountered pixel, which is not NEAR the center pixel and is also (not FAR from the center pixel, or not NEAR the OTHER reference pixel above) is classified as Bad pixel.

4. Finally, the OTHER classes 6 and 7 are dependent on encountering no Bad pixels within the window. Class 6 (OthDark) or 7 (OthLite) are differentiated based on the color value of the referenced OTHER pixel.

The PDL separation Module is responsible for splitting the incoming source signal Src into the Foreground and Background planes Fgr and Bgr, respectively. The separation is based on the binary Selector plane Sel. The separation process begins by initializing the foreground and background planes with the special reserved code of zero (L=a=b=0) to indicate non-used pixels Next, the incoming color Src values are moved away from zero to prevent confusion with the special reserved code of "not used":

Val=Max (1, Src);

The Max function ensures than Val is never zero in any of its planes. The Separation process continues in a straight-forward manner:

If (Sel=1) then Fgd=Val; else Bgd=Val;

That is, each incoming color pixel is placed in either the Foreground or Background. Unlike the case of scanned documents, the information is never placed into both planes, not even in the neighborhood of edges. Thus the separation scheme is much simplified relative to the Scan case.

Figure 15:
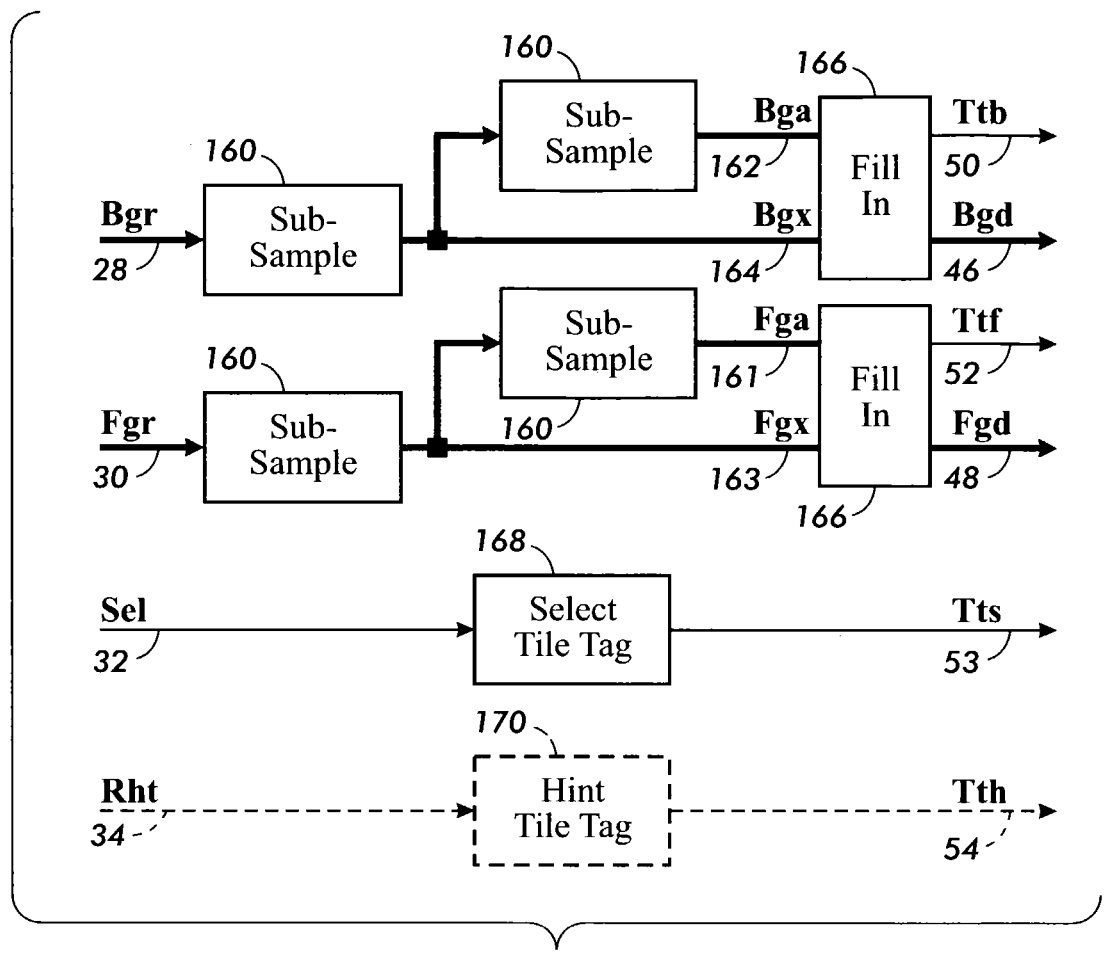
FIG. 15 is a block diagram of the MRC Scale and Tile Tag Generation Module (FG/BG Cleanup Module).

Referring to FIG. 15, the MRC Scale and Tile Tag Generation Module 44 applies additional processing on the rough Foreground and Background estimates Fgr 30 and Bgr 28 to generate the final Foreground and Background outputs Fgd 48 and Bgd 46. The processing done by the MRC Scale and Tile Tag Generation Module 44 is to first sub-sample using a Sub-Sample Module 160 the Foreground and Background values while ignoring undefined pixels. Next it sub-samples using a Sub-Sample Module 160 this result by a factor of 8 to compute a block average (again ignoring undefined pixels). The $3^{rd}$ step is to insert using a Fill In Block Module 166 the computed block average into undefined pixels. The aim is to reduce JPEG compression ringing artifacts by filling in the undefined pixels with the block average.

An additional logic inside the MRC Scale and Tile Tag Generation Module 44 also monitors the Foreground and Background output values to detect and flag constant all-black or all-white tiles. Similar logic detects when the selector and hint are all zero. A block diagram of the MRC Scale and Tile Tag Generation Module is shown in FIG. 15.

All four instances of Sub-Sampling Module 160 operate in a similar way. The sum of all pixels in an N×N area is computed while keeping a separate count of the number of pixels which are valid=notZero. The sum is then normalized by the count of valid pixels to produce the output. The first stage of subsampling is typically over a 4×4 area representing the overall degree of sub-sampling of the Fgd 48 and Bgd 46. The amount of subsampling is specified by the parameters: Seg_Fgd_ScaleDn, SEG_Bgd_ScaleDn, SEG_Fgd_Dst_Css, SEG_Bgd_Dst_Css The Css parameter controls whether the chroma samples are additionally subsampled by a factor of 2. The second stage always sub-samples over an 8×8 area representing the JPEG block size at the subsampled resolution. The final normalization of the subsampled output is dependent on the value of the total weight. However, it is still possible to avoid the division operation in equation by using a predetermined multiplication table with multiple choices for the possible total weight values.

The Fill In Blocks 166 insert the block averages Fga 161 and Bga 162 into Fgx 163 and Bgx 164 replacing all undefined pixels and producing the final foreground Fgd 48 and background Bgd 46 signals. The Fill In Blocks 166 also produce a very low bandwidth outputs Ttb 50 and Tff 52 of one bt per tile or strip which can be used to optimize the compression when CEF files are exported. Each Fill In Block 166 monitors each pixel in a tile, testing whether all pixels are within limits set for the luminance and chrominance samples. If all tile pixels pass all the tests then the tile tag bit is set. Each pixel has 3 tests performed:

LumRef-L <=TileLumErr {where LumRef is 255 for Bgd and 0 for Fgd} abs(128-A) <=TileChrmErr abs(128-B) <=TileChrmErr

The Sel Tile Tag 168 and Hat Tile Tag 170 modules are nothing more than the equivalent of large NOR gates operating over one tile block. They produce a 1 if all the binary pixels in a tile are 0. The tile sizes are programmable, but typical values vary from 64×64 to 512×512 pixels.

Figure 16:
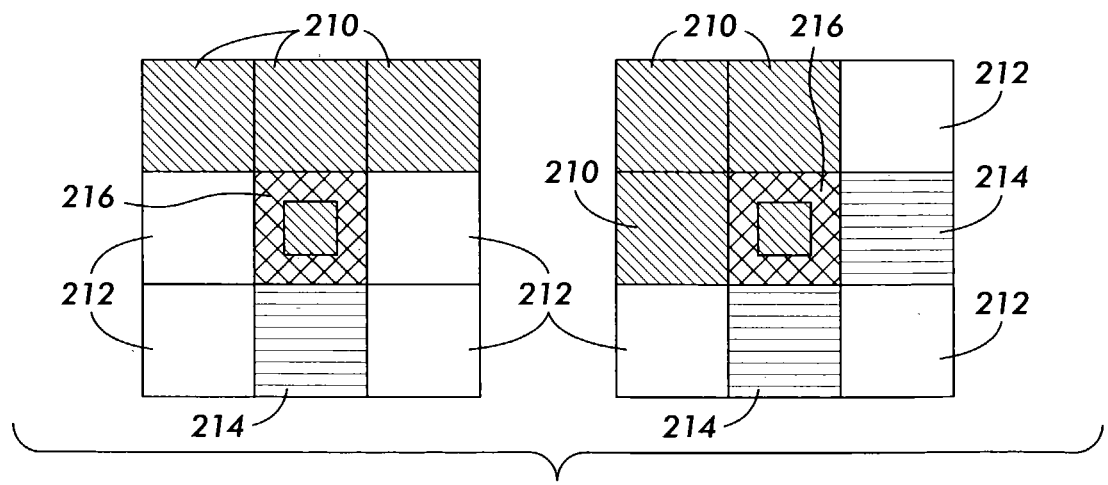
FIG. 16 is a block diagram illustrating Foreground Erosion.

Referring once again to FIG. 3, the Foreground Erosion Unit 200 is used to meet thin (but unbroken) kanji requirements using linear YCC segmentation. A fixed value is subtracted from the gray selector, thereby thinning/eroding the foreground. In cases where the pixel would be converted from foreground to background, this is only done if a neighborhood test verifies that the thinning won't result in broken lines. Referring to FIG. 16, a diagram illustrates the operation for this module 200. The Foreground Erosion Unit 200 attempts to match a couple of templates. If a match is found, then the adjustment is performed. FIG. 16 shows the 2 patterns. Hatched block 210 represents Background and hatched block 214 represents Strong Foreground that is larger than the adjustment. Hatched block 216 represent Weak Foreground that will change to background if the adjustment is subtracted. Blocks 212 are unspecified. The Weak Foreground 216 is only allowed to switch to Background 210 if one of the two patterns shown in FIG. 16 matches (each has 4 possible orientations).

While certain exemplary embodiments have been described in detail and shown in the accompanying drawings, those of ordinary skill in the art will recognize that the invention is not limited to the embodiments described and that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and spirit of the invention as defined by the appended claims.

What is claimed is:

1. A method for separating an image signal into a set of image planes in accordance with a control signal, the method comprising the operations of:

receiving the control signal and producing a threshold selector signal, via a selector module based on the control signal;

receiving the selector signal and producing a decision signal, via an edge processing module;

receiving the image signal and the decision signal, and outputting an initial foreground signal and an initial background signal, via a foreground/background separation module, a representation of the current pixel of the image signal being included in at least one of the initial foreground signal and the initial background signal in accordance with the decision signal; and sub-sampling, by a programmable amount, the initial foreground signal and the initial background signal while ignoring undefined pixels.

2. The method of claim 1, further comprising:

filling undefined pixels in the initial foreground and initial background signals with values computed so as to substantially prevent artifacts and to facilitate good compression ratio, using a cleanup module; and outputting a final foreground signal and a final background signal.

3. The method of claim 2, wherein the operation of filling comprises:

extending content of defined pixels in each of the initial foreground and initial background signals to neighboring undefined pixels by filling neighboring undefined pixels with diluted foreground and background values, respectively, using a dilate module;

averaging non-zero content of the diluted foreground and background values over minimum coded unit blocks and outputting averaged block values, using a block average module; and filling any remaining undefined pixels with the averaged block values, using a fill module.

4. A system for separating an image signal into a set of image planes in accordance with a control signal, the system comprising:

a selector module receiving the control signal and producing a threshold selector signal based on the control signal;

an edge processing module receiving the selector signal and producing a decision signal;

a foreground/background separation module receiving the image signal and the decision signal, and outputting an initial foreground signal and an initial background signal, a representation of the current pixel of the image signal being included in at least one of the initial foreground signal and the initial background signal in accordance with the decision signal; and a sub-sampling module sub-sampling, by a programmable amount, the initial foreground signal and the initial background signal and ignoring undefined pixels.

5. The system of claim 4, further comprising:

a cleanup module comprising the sub-sampling module, the cleanup module receiving the initial foreground signal and the initial background signal, filling undefined pixels in the initial foreground and initial background signals with values computed to substantially prevent compression ringing artifacts, and to facilitate good compression ratio and outputting a final foreground signal and a final background signal.

6. The system of claim 5, wherein the cleanup module further comprises:

a dilate module extending content of defined pixels in each of the initial foreground and initial background signals to neighboring undefined pixels by filling neighboring undefined pixels with diluted foreground and background values, respectively;

a block average module averaging non-zero content of the diluted foreground and background values over minimum coded unit blocks and outputting averaged block values; and a fill module filling any remaining undefined pixels with the averaged block values.

7. An article of manufacture comprising:

a machine usable medium having program code embedded therein, the program code being used for separating an image signal into a set of image planes in accordance with a control signal, the program code comprising:

machine readable code to receive and process the control signal, and produce a threshold selector signal based on the control signal;

machine readable code to receive the selector signal and produce a decision signal;

machine readable code to receive and process the image signal and the decision signal, and output an initial foreground signal and an initial background signal, a representation of the current pixel of the image signal being included in at least one of the initial foreground signal and the initial background signal in accordance with the decision signal; and machine readable code to sub-sample, by a programmable amount, the initial foreground signal and the initial background signal while ignoring undefined pixels.

8. The article of manufacture of claim 7 wherein the machine readable code further comprises:

machine readable code to receive the initial foreground signal and the initial background signal;

machine readable code to fill undefined pixels in the initial foreground and initial background signals with values computed so as to substantially prevent artifacts and to facilitate good compression ratio; and a machine readable coded to output a final foreground signal and a final background signal.

9. The article of manufacture of claim 8, wherein the machine readable code to fill undefined pixels comprises:

machine readable code to extend content of defined pixels in each of the initial foreground and initial background signals to neighboring undefined pixels by filling neighboring undefined pixels with diluted foreground and background values, respectively;

machine readable code to average non-zero content of the diluted foreground and background values over minimum coded unit blocks and to output averaged block values; and machine readable code to fill any remaining undefined pixels with the averaged block values.

10. A system for separating an image signal into a set of image planes in accordance with a control signal, the system comprising:

means for receiving the control signal and producing a threshold selector signal, via a selector module based on the control signal;

means for receiving the selector signal and producing a decision signal, via an edge processing module; and means for receiving the image signal and the decision signal, and outputting an initial foreground signal and an initial background signal, via a foreground/background separation module, a representation of the current pixel of the image signal being included in at least one of the initial foreground signal and the initial background signal in accordance with the decision signal; and means for sub-sampling, by a programmable amount, the initial foreground signal and the initial background signal and ignoring undefined pixels.

11. The system of claim 10, further comprising:

means for filling undefined pixels in the initial foreground and initial background signals with values computed so as to substantially prevent artifacts and to facilitate good compression ratio, using a cleanup module; and means for outputting a final foreground signal a final background signal.

12. The system of claim 11, wherein the means for filling comprises:

means for extending content of defined pixels in each of the initial foreground and initial background signals to neighboring undefined pixels by filling neighboring undefined pixels with diluted foreground and background values, respectively, using a dilate module;

means for averaging non-zero content of the diluted foreground and background values over minimum coded unit blocks and outputting averaged block values, using a block average module; and means for filling any remaining undefined pixels with the averaged block values, using a fill module.

* * * * *